US009852611B2

United States Patent
Côté

(10) Patent No.: US 9,852,611 B2
(45) Date of Patent: Dec. 26, 2017

(54) METHOD AND SYSTEM FOR MONITORING AN ALARM SYSTEM

(71) Applicant: Réseau Multi Networks inc., La Prairie (CA)

(72) Inventor: Gaétan Côté, La Prairie (CA)

(73) Assignee: Reseau Multi Networks Inc., La Prairie (CA)

( * ) Notice: Subject to any disclaimer, the term of this patent is extended or adjusted under 35 U.S.C. 154(b) by 10 days.

(21) Appl. No.: 14/909,878

(22) PCT Filed: Aug. 7, 2014

(86) PCT No.: PCT/CA2014/000611
§ 371 (c)(1),
(2) Date: Feb. 3, 2016

(87) PCT Pub. No.: WO2015/017918
PCT Pub. Date: Feb. 12, 2015

(65) Prior Publication Data
US 2016/0180699 A1    Jun. 23, 2016

Related U.S. Application Data

(60) Provisional application No. 61/863,471, filed on Aug. 8, 2013.

(51) Int. Cl.
| | |
|---|---|
| G08B 29/00 | (2006.01) |
| G08B 29/02 | (2006.01) |
| H04W 4/22 | (2009.01) |
| H04M 11/04 | (2006.01) |
| H04W 76/00 | (2009.01) |

(52) U.S. Cl.
CPC ............. *G08B 29/02* (2013.01); *H04M 11/04* (2013.01); *H04W 4/22* (2013.01); *H04W 76/007* (2013.01)

(58) Field of Classification Search
CPC .......... G08B 29/02; H04M 11/04; H04W 4/22
USPC ........................................................ 340/506
See application file for complete search history.

(56) References Cited

U.S. PATENT DOCUMENTS

| | | |
|---|---|---|
| 6,032,037 A | 2/2000 | Jeffers |
| 6,965,313 B1 | 11/2005 | Saylor et al. |
| 7,015,806 B2 | 3/2006 | Naidoo et al. |
| 7,629,512 B1 | 11/2009 | Trundle et al. |

(Continued)

OTHER PUBLICATIONS

PCT/CA/2014000611—ISR dated Oct. 20, 2014, Réseau Multi Network inc.

*Primary Examiner* — Kerri McNally
(74) *Attorney, Agent, or Firm* — Agence de Brevets Fournier (57) ABSTRACT

The problem of the vulnerability of an alarm system when its communication with an alarm central is lost or nonexistent is solved by maintaining a monitoring channel with the alarm system. A server establishes and maintains the communication channel with the alarm system via an interface module connected to the alarm system, and if the alarm system is unable to communicate with an alarm central receiver, or if the first communication channel is closed, then the server connects to one or both of the alarm central receiver and a user's phone, so as to communicate a message thereto indicative of a breach or failure of the alarm system. The alarm system is connected to the alarm central through the monitoring server which then acts as a gateway.

20 Claims, 3 Drawing Sheets

(56) References Cited

U.S. PATENT DOCUMENTS

| | | |
|---|---|---|
| 8,164,614 B2 | 4/2012 | Carter |
| 2008/0020747 A1* | 1/2008 | McQuaide ............ G08B 25/009 455/423 |
| 2012/0188072 A1* | 7/2012 | Dawes ................... G06Q 50/06 340/514 |

* cited by examiner

METHOD AND SYSTEM FOR MONITORING AN ALARM SYSTEM

FOREIGN PRIORITY CLAIM

This is a 35 U.S.C. §371 application of, and claims priority to, International Application No. PCT/CA2014/000611, which was filed on Aug. 7, 2014, and published as Publication No. WO2015/017918 A1, which claims priority to U.S. Provisional Patent Application No. US61/863,471, which was filed on Aug. 8, 2013, the entirety of all the applications are incorporated herein by reference.

BACKGROUND

The present disclosure relates to alarm systems and more specifically to a method and system for monitoring alarm systems. The present disclosure also relates to VOIP (Voice Over Internet Protocol) and GSM (Global System for Mobile Communications) connectivity.

Alarm systems, which are also known as security systems, burglar systems, etc., are conventionally connectable to an alarm central through a public switched telephone network (PSTN), whereby synthesized voice or an encoded message string are communicated when an alarm is triggered. However, if the PSTN line is hacked or is unavailable, such a conventional alarm system becomes unable to reach out the alarm central.

More and more alarm systems are equipped with a cellular backup system or with IP (Internet Protocol) connectivity that creates a 'fail-safe' communication path from the intrusion detection system to the central monitoring station via a GSM or CDMA (Code division multiple access) cellular data network.

A drawback of such backup systems is that, contrarily to alarm systems communicating through a PSTN, they go out when the cellular data network or Internet goes down.

In addition to involving additional costs to the end-user, a cellular backup system or an Internet monitored alarm system can also be respectively rendered unable by a cellular jammer (cellular backup) or cut-off with the simple snip of a wire (Internet and PSTN).

In all those cases, an alarm central becomes unable to receive from the alarm system an alarm message indicative of a breach of security.

Some alarm systems have an interactive platform allowing users to interact with lights, climate control, alarm, audio/video. However, such an interactive platform implies that an event has to be triggered with the push of a button or via an infra red (IR) detector. Also, these functionalities are not available with most alarm system.

SUMMARY

The problem of the vulnerability of an alarm system when its communication with an alarm central is lost or nonexistent is solved by maintaining a monitoring channel with the alarm system or with alarm system sensors.

According to some embodiments, such a monitoring system and method yields three (3) layers of security: 1) a main communication channel with an alarm central, and 2) a back up channel between the alarm system and the alarm central; and 3) continuous monitoring of the alarm system and communication therefrom.

In accordance with illustrative embodiments, there is provided a monitoring system for an alarm system, the monitoring system comprising:

a server adapted i) for establishing and maintaining a first communication channel with the alarm system, ii) for verifying ii1) through the first communication channel whether the alarm system is unable to communicate with an alarm central receiver when an event is detected by the alarm system or ii2) whether the first communication channel is closed; and iii) for connecting to at least one of a) the alarm central receiver and b) at least one first user communication device and communicating thereto an emergency message, when iv) the server determines that at least one of ii1) and ii2) is true; and an interface module connected to the alarm system for allowing said establishing and maintaining the first communication channel.

According to another embodiment, there is provided an alarm system comprising:

at least one device that generates a first signal indicative of a state thereof;

a gateway terminal adapted for wireless communication with the at least one device for receiving the first signal therefrom; and a monitoring server for i) establishing and maintaining a communication channel with the gateway terminal, ii) for receiving a second signal therefrom indicative of the first signal; and iii) for triggering an alarm based on at least one of the first and second signals, or when the communication channel is closed.

According to still another embodiment, there is provided a combined GSM/WiFi module for connection to a wireless alarm system, yielding two different paths for the digital network According to a further embodiment, there is provided a method for remote monitoring of an alarm system, the method comprising:

a) a server establishing and maintaining a first communication channel with the alarm system; and if i) an event is detected by the alarm system and the alarm system is unable to communicate with an alarm central receiver or ii) the first communication channel is closed, then b) the server connecting to at least one of the alarm central receiver and a first user communication device and communicating an emergency message thereto.

Other objects, advantages and features will become more apparent upon reading of the following non-restrictive description of illustrative embodiments thereof, given by way of example only with reference to the accompanying drawings.

DETAILED DESCRIPTION

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

The expression "module" is to be construed in the description and in the claims as any hardware component or components subset that is designed and/or programmed to produce one of more specific functions.

The expression "communicating" is to be construed in the description and in the claims so as to include one or both of "receiving" and "transmitting".

The expression "message" is to be construed in the description and in the claims as an information or a piece of information that is readable by a digital or analog processor, module or device.

The expression "server" should be construed herein in its broadest sense as an electronic machine that can automatically perform operations on any forms of digital information, that stores this information in a sustainable manner and that hosts a software for use in a telecommunications network, according to the client-server model.

Figure 1:
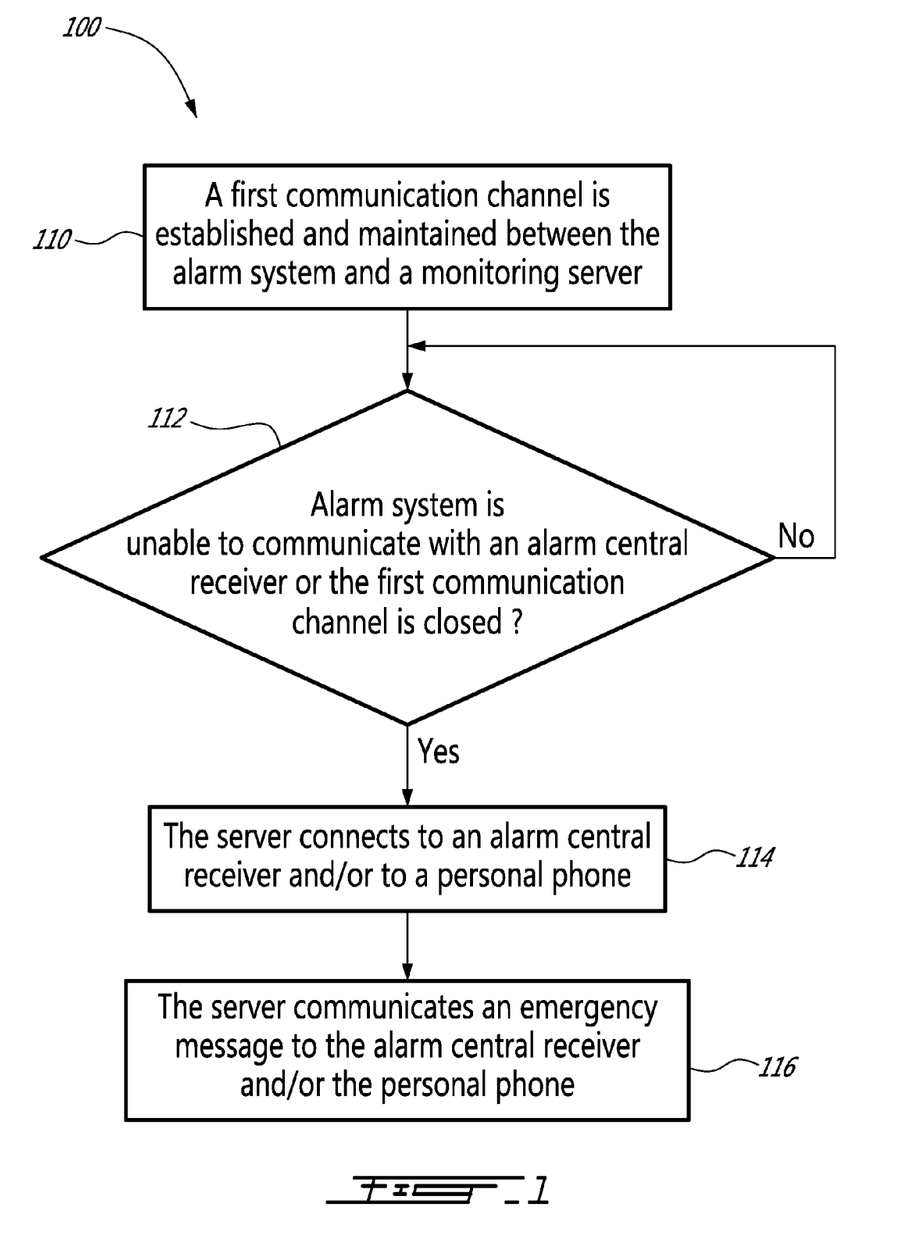
FIG. 1 is a flowchart of a first illustrative embodiment of a method for remote monitoring of an alarm system.
Figure 2:
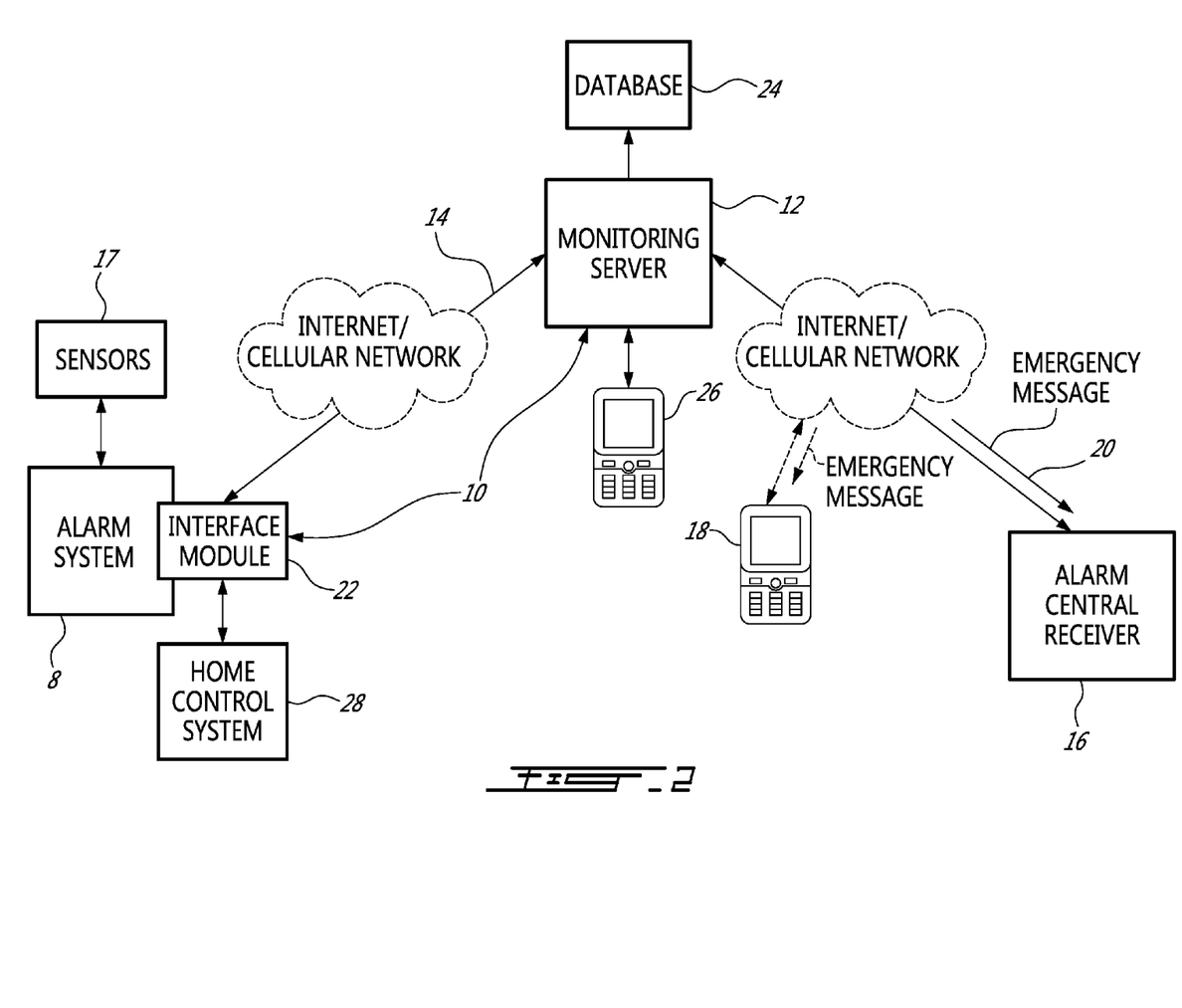
FIG. 2 is a block diagram of a first illustrative embodiment of a system for remote monitoring of an alarm system.

With reference to FIGS. 1 and 2, a method 100 for remote monitoring of an alarm system 8 according to a first illustrative embodiment will now be described.

According to the method 100:

110—a first communication channel 14 is established and maintained between the alarm system 8 and a monitoring server 12;

112—the server 12 verifies via the first communication channel 14 whether the alarm system 8 is able to communicate with an alarm central receiver 16 or if the communication channel is closed;

if the alarm system 8 is unable to communicate with the alarm central receiver 16 or if the communication channel 14 is closed, then 114—the server 12 connects to the alarm central receiver 16 and/or to a client's phone 18; and 116—the server 12 communicates an emergency message 20 to the alarm central receiver 16 and/or one or more selected user devices such as phones 18.

Step 110 is contrary to alarm systems from the prior art, wherein such systems open a communication channel with a monitoring central only for a brief period of time necessary to send an alarm-related message. In alarm systems from the prior art, the communication channel, that can be for example in the form of a PSTN line or a cellular network, is closed once the message is received.

According to the method 100, a connection is created with the monitoring server 12 and remains active, even when the alarm system 8 has no information to transfer. This allows the monitoring server 12 to dynamically detect events that remains undetected by conventional alarm central, including without limitations a broken connection.

Embodiments of a monitoring system and method for alarm system as described herein yields a further layer of security, in addition to i) the conventional operation functionalities of the alarm system 8 and ii) a conventional cellular backup that is included therewith in some embodiment.

Cellular backups and backups through Internet connectivity are believed to be well-known in the art and will not be described herein in more detail for concision purposes.

The expression "alarm central receiver" is intended to be construed broadly in the description and in the claims as including electronic systems that are configured and/or programmed to remotely receive calls, messages and/or signals from alarm systems, the calls and/or signals being indicative of the state of one or more sensor devices connected to said alarm systems when a reportable events occurred.

Since alarm central receivers are believed to be well known in the art, they will not be described herein in more detail for concision purposes.

The expression "alarm system" is to be construed broadly in the description and in the claims as any electronic system or device having at least one sensor for detecting or measuring a state or change of state of another device, system, sensor, apparatus, object, building, premises, area or any combination thereof and for emitting a signal indicative of such state or change of state, including without limitations autonomous and de-centralized sensors and devices.

The expression "reportable event" is to be construed broadly in the description and in the claims so as to include a message and/or a signal indicative of a state or a change of state of a device, system, sensor, apparatus, object, building, premises, area or any combination thereof associated to a security system of any kind.

As will be described furtherin in more details, the method 100 and a system 10 or 30 implementing such a method also allows implementing further functionalities in addition to those related to security.

The network configuration resulting from the method 100 is shown in FIG. 2.

A monitoring system 10 according to a first illustrative embodiment includes the monitoring server 12 and an interface module 22 that is connected to the alarm system 8 for allowing the communication channel 14 between the alarm system 8 and the monitoring server 12. A person skilled in the art will appreciate that the interface module 22 acts as a gateway between the alarm system 12 and the monitoring server 12.

The alarm system 8 according to the first illustrative embodiment is in the form of a typical alarm system, i.e. including an alarm system module (not shown) that is connectable to an alarm central receiver 16, a command module (not shown) conventionally provided with a keypad (not shown) and sensors 17 coupled wirelessly to the command module and/or connected thereto using wires. Since such a typical alarm system is believed to be well-known in the art, it will not be described herein in more detail for concision purposes.

The sensors 17 can include, without limitations, motion detectors, contact sensors, glass break detectors, flow sensors, fire detectors, etc.

As will become more apparent upon reading the following description, monitoring methods and systems according to illustrative embodiments described herein can be adapted for connection to an alarm system having an atypical configuration and for the monitoring thereof.

According to the first illustrative embodiment, the interface module 22 includes a GSM (Global System for Mobile Communications) module coupled to the alarm system 8. As it is believed to be well-known, by a person skilled in the art, a GSM module allows sending a signal through a digital network such as Internet or a GSM network (not shown). Since GSM modules are believed to be well-known in the art, they will not be described herein in more detail.

According to the first illustrative embodiment, the interface module 22 connects directly on the bus of the alarm system 8 in order to trigger well-known events, such as arm/disarm, and to retrieve their status, such as Zone #1, Zone #2, . . . . The module 22 is however not limited to this particular connection, which can be adapted to the specificities of the alarm system 8. The interface module is provided with a well-known RS-232 serial port allowing connection of the interface module to the alarm system for example via an home automation board or an IP module board connectable to the alarm system. In other embodiments, the interface module 22 is retrofitted or integrated to the alarm system 8.

Due to its connectability to the bus of the keypad or of the alarm system module, the interface module can be connected adjacent the alarm system module or its keypad(s) or anywhere relative thereto, allowing to maximize GSM reception.

According to another embodiment, the interface module 22 is substituted or supplemented by a communication module configured for allowing wireless or wired communications through another standard, such as LTE (Long-Term Evolution), ZWave, Bluetooth, and WiFi. Of course, the monitoring server 12 is configured for communication with the interface module 22 through the same standard.

According to the first illustrative embodiment, there is no direct connection between the alarm system 8 and the alarm central receiver 16. The interface module 22 is operatively coupled to the monitoring server 12, which acts as a gateway between the system 8 and the alarm central monitoring system 16.

According to another embodiment, the 'conventional' connection between the alarm system 8 and the alarm central receiver 16 is present in addition to the above described network configuration (see FIG. 1). Such direct connection between the alarm system 8 and the alarm central receiver 16 is established through a PSTN line.

According to a more specific embodiment, the monitoring server 12 simultaneously monitors a plurality of alarm systems 8 that are not necessarily associated to a same alarm central receiver 16.

To dispatch an alarm-related message from one of the alarm system 8 to which it is associated to the associated alarm central, the server 12 is configured to access a database 24 including such information. The database 24 is either connected directly to the server 12 or remotely access thereby via Internet or any other proprietary or public network (both not shown).

The server 12 is configured to transfer information, including alarm-related messages, seamlessly between the alarm system 8 and the alarm central receiver 16.

Alarm-related messages are for example in the form of ASCII (American Standard Code for Information Interchange) codes, each referring the one sensor 17 coupled to the alarm system 8 that detected an event or more generally that has been triggered. "PATIO-DOOR-ALARM" is an example of such a message.

More generally, alarm-related messages are digital or analog signals including alarm system/central readable information that generally relates to the operation and status of the alarm system 8 and sensors 17 coupled thereto.

Depending on the alarm system 8 and alarm central receiver 16, such code is conventionally sent through a PSTN (Public switch telephone network) or is digitized and sent through Internet.

The server 12 is configured to recognize such alarm-related message and to relay it between the alarm system 8 and alarm central receiver 16.

According to the first illustrative embodiment, the interface module 22 translates a PSTN message from the alarm system 8 and forward the translated message to the monitoring server 12 via Internet. Using the database 24, the server 12 associates the identity or address of the alarm system 8 to the alarm central receiver 16 that is associated thereto for monitoring purposes and forwards the alarm-related message thereto after any required translation thereof. The server 12 acts similarly for messages from the alarm central 14 to the alarm system 8. As it is well-known by a person skilled in the art, such messages can be in the form, without limitations, of acknowledgments, voice communications, etc.

The monitoring server 12 and the interface module 22 can be adapted for transmission and reception of alarm-related messages of various forms and through communication channels of any kind.

Since the communication channel 14 is kept active between the alarm system 8 and the monitoring server 12, the server 12 can detect when the GSM network is unreachable by the alarm system 8. The closing of the communication channel 14 can be caused for example by a failure of the alarm system 8, including of the interface module 22, or a GSM jammer. If for any reason, the interface module 22 is unable to reach the monitoring server 12, the server 12 is configured to wait a predetermined time before raising an alarm to the corresponding alarm central receiver 16.

Moreover, when the failure is due to a GSM jammer (not shown), the interface module 22 might even have the time to detect the GSM jammer and send a message to the server 12 via PSTN or Internet indicative of the presence of the jammer.

GSM jammers and jammer technology are both believed to be well-known in the art and, as such, they will not be described herein in more detail for concision purposes.

The interface module 22 is not limited to allow communication through a GSM channel. For example, the interface module 22, can alternatively or additionally be configured so as to further provide WiFi connectivity thereto. Such WiFi capability allows, for example, coupling the interface module 22 to a wireless alarm system (not shown).

According to still another embodiment, the interface module 22 includes a 8P8C port (eight (8) positions and eight (8) electrical contacts, also known as RJ-45) for direct connection to a Local Area Network (LAN) or Internet.

The interface module 22 can further be configured to include VOIP (Voice Over Internet Protocol) capability, allowing for example communication through Session Initiation Protocol (SIP) and/or Skype™.

According to a more specific embodiment, and taking advantage from its connection to Internet and to the monitoring server 12, the interface module 22 is made accessible from an interactive application for smart phone 26 and/or any computer device (not shown).

According to the same embodiment, the interface module 22 is controlled with voice command via the interactive application and/or via a touch screen. The interactive application implements two modes: i) press and ii) talk. A user interface (not shown) is included in the interactive application, that allows selecting voice command or touch screen input via a graphical user interface. For example, the interactive application allows the automatic activation of the voice command mode when a predetermined word or expression is spoken via the phone 26. The users is then allowed to control every features of the interface module 22 and of the alarm system 8.

According to another embodiment, the interactive application is configured so as to allow a single interactive mode. Also, an interactive application used as described hereinabove is not limited to the above-described interactive modes and can be implemented according to any mode as known in the art.

According to still another embodiment, the interface module can be accessed and controlled via any voice command equipped vehicle, including without limitation, Uconnect™, Sync™, Onstar™, etc.

It is to be noted that one or more of the electronic devices 26 can be the same as one or more of the devices 18.

It is believed to be within the reach of a person skilled in the art to configured the interface module 22 and monitoring server 12 to allow the above-described remote interaction of a user with the interface module 22.

The interface module 22 can be connected to a well-known home control system 28 so as to allow a users to control lights, climate, alarm/security, cameras, audio/video equipments, etc. for example via the interactive application as described hereinabove. Also, coupling a home control system 28 to the interface module 22 results in a more efficient alarm system since additional events can be added to the list of reportable events.

Since the communication channel between the alarm system 8 and monitoring server 12 remains opened at all time, an illustrative embodiment of a system for monitoring an alarm system 8 yields an improved security even when the alarm system 8 is unarmed.

Indeed, the interface module 22 and/or monitoring server 12 can be programmed to recognized identifiers of cellular phones owned by persons allowed to enter the premises or more generally the secured zone that is under surveillance of the alarm system 8. This can be achieved by implementing a Bluetooth or WiFi connectivity of the phones 26 to the interface module 22. The interface module 22 can be programmed to trigger an alarm when i) an intrusion and/or movement is detected by the alarm system sensors 17 or more generally when an events is detected and ii) when the interface module determines that the aforementioned allowed persons are absent from the premises. This is particularly advantageous when the alarm system 8 is not armed.

Similarly, such functionality allows programming the monitoring server 12 and/or the interface module 22 so as to trigger functions of the alarm system 8 and/or those of peripheral devices connected thereto based on the geolocation of selected phone or other GPS enabled devices.

According to a another illustrative embodiment, the alarm system can be in the form of autonomous and de-centralized sensors and devices, such as for example those configured for operation under the Z-Wave protocol. According to such an embodiments, the signals of such sensors and devices are read by the interface module 22 and forwards to the monitoring server 12 via the communication channel 14. Implementing such an embodiment to secure a premises or more generally a zone is advantageous where there is no alarm system and/or such an alarm system is unconnected or unconnectable to an alarm central, such as for example in a remote area.

Figure 3:
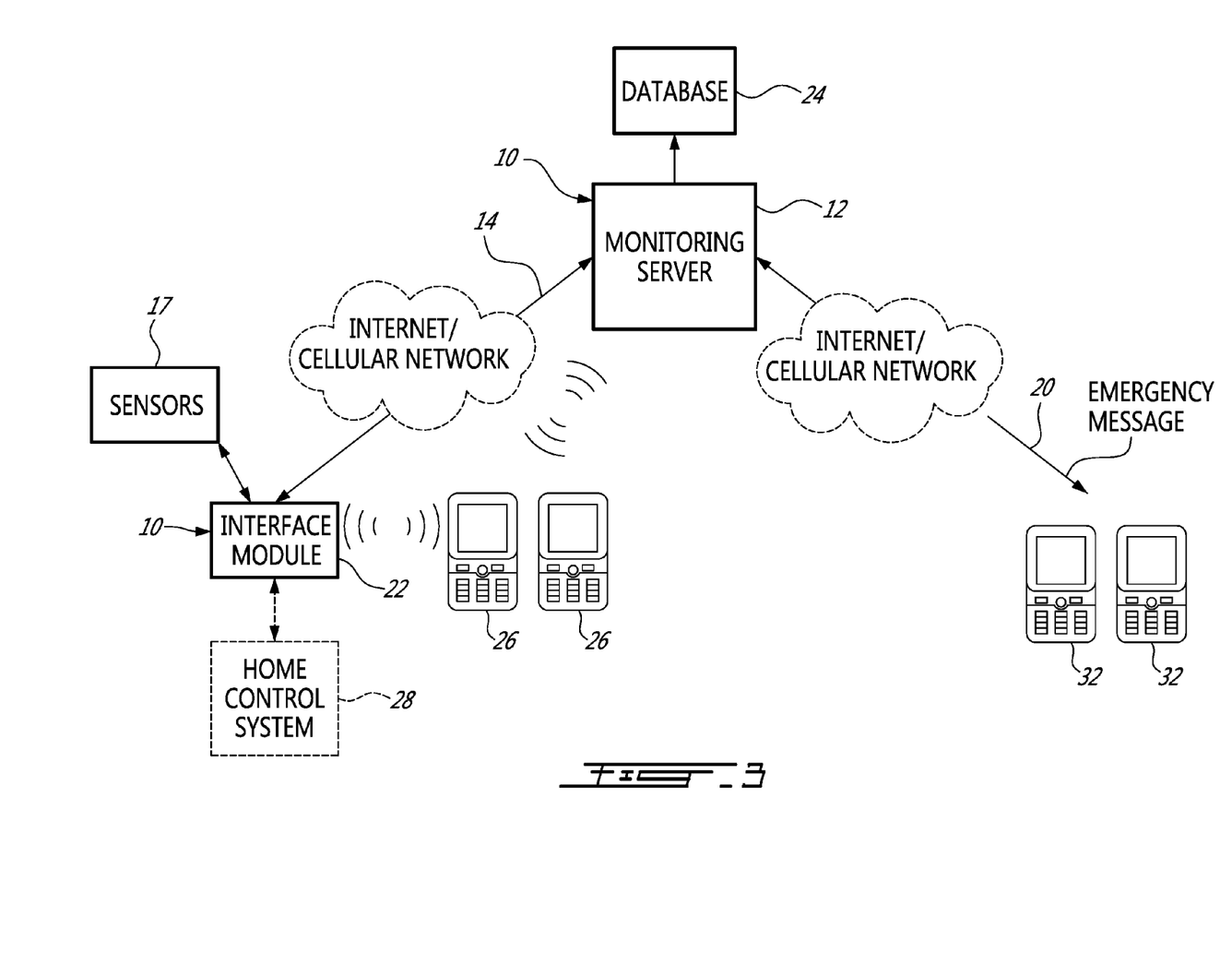
FIG. 3 is a block diagram of a second illustrative embodiment of a system for remote monitoring of an alarm system.

With reference to FIG. 3, a monitoring system 30 according to a second illustrative embodiment, will now be described. Since the system 30 is similar to the system 10, only the differences will be described herein in more detail for concision purposes.

It is first to be noted that the system 30 can be implemented in a premises alternatively to the system 10 or additionally thereto.

The interface module 22 and/or monitoring server 12 is configured to detect and monitor the presence of predetermined portable phones 26 through cellular communication, z-wave protocol and/or WiFi.

Similarly to the previously presented embodiment, the interface module 22 is directly coupled to the sensors 17.

In operation, when one of the sensors 17 detects a reportable events while none of the predetermined portable phones 26 are detected by the interface module 22 in the secured zone, an alarm related message is sent from the terminal 22 to the monitoring server 12. The monitoring server 12 then triggers an alarm and sends a message or signal indicative thereof to one or a plurality of selected portable phones 32 or any other predetermined device(s) reachable through Internet or via a phone (cellular or PSTN) network by the monitoring server 12. It is to be noted that one or more of the selected portable phones 32 and/or other devices can be the same that the above-mentioned predetermined portable phones 26.

A person skilled in the art would now appreciate that the system 30 can be implemented for example where no alarm system 8 is connectable or connected to an alarm central, such as in a remote area.

According to another illustrative embodiment, a GSM module is further configured for WiFi connectivity. Such a module can be retrofitted to most wireless alarm systems by being connectable directly on the proprietary connector of an existing alarm system.

The use of such a module is advantageous even without its connection to a monitoring server as described hereinabove. Indeed, the additional WiFi connectivity provided to the alarm system to which it is connected yields a more secured alarm systems by providing a backup connection to the alarm central receiver for example when the Internet or PSTN cable is damaged or cut and a GSM jammer is used.

Such a combined GSM/WiFi module further allows remote control of a home control system such as described hereinabove.

Also, as described herinabove, the use of the GSM/WiFi module according to the third illustrative embodiment allows controlling an home control system via an interactive application for smart phone by direct access to the Internet.

It is to be noted that many modifications could be made to a monitoring system and method described hereinabove and illustrated in the appended drawings. For example:

while the alarm central receiver 16 has been shown hereinabove as being connected to the alarm system 8 via the monitoring server 12 and interface module 22, it can also be directly connected to the alarm system 8 as it is conventionally known, while the monitoring server 12 remains connected to the alarm system 8 via the interface module as described hereinabove;

the alarm central receiver 16 can be substituted in the operational network configuration shown in FIG. 2 by one or a plurality of user phones or other similar communication devices that are contacted by the monitoring server 12 (such as shown in FIG. 3). More specifically, the server 12 sends a SMS (Short Message Service), an email and/or a pre-recorded voice message is for example that is indicative of the alarm-related message and hence of the breach detected by the alarm system 8;

more than one communication channels can be established and maintained between the monitoring server 12 and the interface module 22;

while the above-described embodiments include a single interface module, a monitoring system for alarm system according to another embodiment can be provided with two interface modules coupled to the alarm system, each for allowing a unique communication channel between the alarm system and the monitoring server;

the interface module 22 may be configured for connecting external modules thereto, for example via a proprietary port accessible directly on the main board of the module 22 or via an external USB connector provided therewith. Such connectivity would allow additional functionalities to the alarm system 8, interface module 22 and/or monitoring server 12.

All communication standards and protocol mentioned hereinabove are only given for illustrative purposes. It is believed to be within the reach of a person skilled in the art to modify the system and method described hereinabove for communicating data under other standards and/or networks.

It is to be understood that embodiments of the monitoring system and method for alarm systems are not limited in their application to the details of construction and parts illustrated in the accompanying drawings and described hereinabove. Other embodiments can be foreseen and practiced in various ways. It is also to be understood that the phraseology or terminology used herein is for the purpose of description and not limitation.

The invention claimed is:

1. A monitoring system for an alarm system, the monitoring system comprising:
    a server adapted i) for establishing and maintaining a first communication channel with the alarm system, ii) for verifying ii1) through the first communication channel whether the alarm system is unable to communicate with an alarm central receiver when an event is detected by the alarm system or ii2) whether the first communication channel is closed; and iii) for connecting to at least one of a) the alarm central receiver and b) at least one first user communication device and communicating thereto an emergency message, when iv) the server determines that at least one of ii1) and ii2) is true; and
    an interface module connected to the alarm system for allowing said establishing and maintaining the first communication channel and for verifying ii3) a presence of at least one second user communication device within a reach of the alarm system; and the server performing step iii), when in step iv) the server determines that at least one of ii1), ii2) is true and ii3) is false.

2. The monitoring system as recited in claim 1, wherein the interface module and the server are configured for communication through at least one of the following protocols: GSM (Global System for Mobile Communications), Internet, LTE (Long-Term Evolution), ZWave, WiFi, and PSTN (Public Switch Telephone Network).

3. The monitoring system as recited in claim 1, wherein the server and the interface module are adapted for relaying information between the alarm system and the alarm central receiver.

4. The monitoring system as recited in claim 1, wherein the first user communication device is selected from the group consisting of a computer, a portable phone or a PSTN phone.

5. The monitoring system as recited in claim 1, wherein verifying ii3) a presence of the at least one second user communication device within a reach of the alarm system is achieved by the interface module detecting the at least one second user communication device via a wireless connection therebetween.

6. The monitoring system as recited in claim 1, wherein the server being further adapted to allow access to the interface module to the at least one second user communication device via an interactive application.

7. The monitoring system as recited in claim 6, wherein the interactive application implements at least one of a graphical user-interface and voice command.

8. The monitoring system as recited in claim 6, wherein the least one of the first user communication device is the same as the at least one of the second user communication device.

9. The monitoring system as recited in claim 1, wherein the interface module is further connected to a home control system for communication therewith by the monitoring server via the interface module.

10. The monitoring system as recited in claim 1, wherein the alarm system includes de-centralized sensors coupled to the interface module.

11. The monitoring system as recited in claim 1, wherein the interface module includes a port for direct connection to the alarm system.

12. The monitoring system as recited in claim 1, wherein the interface module is adapted to trigger an event on the alarm system and to retrieve statuses of a device connected to the alarm system.

13. The monitoring system as recited in claim 1, wherein the interface module includes at least one of VoIP (Voice Over Internet Protocol) and PSTN (public switched telephone network) communication capabilities.

14. The monitoring system as recited in claim 1, wherein the alarm system implements a cellular backup.

15. The monitoring system as recited in claim 1, that is adapted to simultaneously monitor a plurality of remote alarm systems, each through an interface module connected to each of the plurality of alarm systems.

16. A method for remote monitoring of an alarm system, the method comprising:
    a) a server establishing and maintaining a first communication channel with the alarm system; and
    if i) an event is detected by the alarm system and the alarm system is unable to communicate with an alarm central receiver or ii) the first communication channel is closed, then
    b) the server connecting to at least one of the alarm central receiver and a first user communication device and communicating an emergency message thereto;
    wherein step b) is not performed when a)i) is true and it is further determined that a predetermined user portable communication device is present from a zone covered by the alarm system or adjacent thereto.

17. The method as recited in claim 16, wherein the server establishing and maintaining the first communication channel with the alarm system via an interface module connected to the alarm system.

18. The method as recited in claim 17, further comprising the server allowing access to the interface module via an interactive application.

19. The method as recited in claim 16, further comprising the server routing messages between the alarm system and the alarm central receiver.

20. The method as recited in claim 16, wherein the first user communication device is selected from the group consisting of a computer, a portable phone or a PSTN phone.

* * * * *